United States Patent
Bentley et al.

[15] 3,639,928
[45] Feb. 8, 1972

[54] ACCELERATOR COMBINATION FOR EPOXY CURING

[72] Inventors: Floyd Edward Bentley; Norman Bell Godfrey, both of Austin, Tex.

[73] Assignee: Jefferson Chemical Company, Inc., Houston, Tex.

[22] Filed: Nov. 27, 1970

[21] Appl. No.: 93,431

[52] U.S. Cl. .................................................. 260/47 EC
[51] Int. Cl. ......................................................... C08g 30/14
[58] Field of Search ................................... 260/47, 47 EC

[56] References Cited

UNITED STATES PATENTS 3,277,052  10/1966  Thompson et al................... 260/47 EP
3,397,177  8/1968   Stolton............................. 260/47 EP
3,462,393  8/1969   Legler.............................. 260/47 EP
3,510,339  5/1970   Glen Wile......................... 260/47 EP

*Primary Examiner*—William N. Short
*Assistant Examiner*—T. Pertilla
*Attorney*—John R. Kirk, Jr., H. G. Jackson and Terrence D. Dreyer

[57] ABSTRACT

An accelerator combination of N-(3-aminopropyl)piperazine and salicylic acid is synergistic for accelerating the cure of a polyglycidyl ether of a polyhydric phenol cured with a polyoxyalkylenepolyamine. The epoxy resin product is useful in castings, coatings, adhesives, laminates, filament reinforced compositions, seamless flooring, terrazo flooring, crushed-stone aggregates and in grouting, caulking and sealing compositions.

5 Claims, No Drawings

ACCELERATOR COMBINATION FOR EPOXY CURING

BACKGROUND OF THE INVENTION

1. Field of the Invention

The invention pertains to an improved process for curing epoxy resins and the resin obtained thereby.

2. Description of the Prior Art

Lee, Henry and Neville, Kris, *Handbook of Epoxy Resins*, McGraw-Hill Book Co., N.Y., 1967 p. 7-14, describes the use of N-(2-aminoethyl)piperazine as an epoxy curing agent and at page 11–18 describes the use of salicylic acid as an accelerator for urea-formaldehyde epoxy resin coatings. Bobby Leger's U.S. Pat. No. 3,462,393 (Aug. 19, 1969) teaches the use of polyoxyalkylenepolyamines as curing agents for a polyglycidyl ether of a phenolic compound.

In many applications of epoxy resins, room temperature cures are not only convenient but sometimes necessary. Curing epoxy resins with polyoxypropylenepolyamines is inconveniently slow at ambient temperatures. The hitherto described accelerators are still too slow for many applications requiring room temperature cures. By using an accelerator combination of our invention with a polyoxypropylenepolyamine, room temperature cures of epoxy resins can be completed in a practical, short period of time.

SUMMARY OF THE INVENTION

The invention is an improvement for curing epoxy resins of polyglycidyl ether of a polyhydric phenol cured with a polyoxyalkylenepolyamine. The improvement is the use of an accelerator combination of N-(3-aminopropyl)piperazine and salicylic acid for faster cures of the epoxy resin.

DESCRIPTION OF THE PREFERRED EMBODIMENTS

The invention is a process for preparing a self-curing epoxy resin composition of (A) a polyglycidyl ether of polyhydric phenol, (B) a polyoxyalkylenepolyamine, (C) N-(3-aminopropyl)piperazine and (D) salicylic acid and the resins obtained therefrom. Preferred examples of (A) include the diglycidyl ether of isopropylidenediphenol and its congeners. Examples of (B) include polyoxyethylene diamines, for example, the bis-(3-aminopropyl)ether of diethylene glycol; polyoxybutylenepolyamines; and polyoxypropylenepolyamines. Preferred examples of (B) include polyoxypropylene diamines of the formula

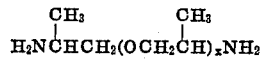

where $x=2$ to 40 and polyoxypropylenetriamines of the formula

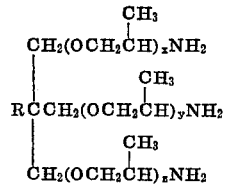

where R is lower alkyl and $x+y+z=3$ to 10.

The order of mixing is not critical to the practice of our invention. For example, components B, C, and D, supra, can be blended in any desired order to give a homogeneous accelerated curing agent, which is then mixed with component A at the time of use.

A more convenient method of practicing this invention is to mix component C and component D. This combination is a clear, stable liquid free of crystals or solids which can be stored for an indefinite period of time, if desired. The combination of components C and D may then be blended with component B prior to mixing with component A.

The weight ratio of component C to component D may vary from 10/1 to 1/1, preferably from 5/1 to 2/1 and in particular 3/1. The combined weight of components C and D present when mixed with component B may range from five parts by weight per 100 parts of B to 30 parts per 100 parts of B. The optimum amount for a given application may vary by some percent and is simply within the skill of the art to determine the desired variation for the most effective amount.

For curing epoxy resins, the hardening agent is usually added in an amount such that there is one reactive —NH group in the hardener component for each epoxy group in the epoxy resin component. These are known as stoichiometric quantities. Sometimes the stoichiometric quantity can be calculated from a knowledge of the chemical structure and analytical data on the components. Sometimes, on the other hand, the stoichiometric quantity is found empirically. In one such method, the maximum exotherm temperature during curing is measured at different hardener concentrations. A graph of exotherm temperature vs. concentration of hardener will show a maximum at or near the stoichiometric quantity.

For the purposes of this invention, the stoichiometric amount of the accelerated hardener is calculated by adding together the number of equivalents (on the basis of weight per replaceable NH group) in components B and C. In general it is advantageous to use up to 10 percent excess of the accelerated hardener over the stoichiometric amount.

The curing temperature range of the ambient temperatures are from about 0° to about 45° C. Post cures at temperatures up to about 200° C. are optional. The cured epoxy resins of the invention are useful in castings, coatings, adhesives, laminates, filament-reinforced composites, seamless flooring, terrazzo flooring, crushed-stone aggregates and in grouting, caulking and sealing compositions.

The following Tables and Examples illustrate the invention in more detail but are not to be construed as limitative.

EXAMPLES 1 to 4

Epoxy resin formulations in Table 1 were mixed in 1-pint paint cans at an ambient temperature of about 25° C. Temperature was measured continuously by means of a thermocouple junction mounted at the center of mass, and time to reach the gel stage of cure was noted. A small portion of each accelerated composition was coated on a steel test panel by means of a 6-mil applicator blade, and allowed to cure at room temperature. Times required to reach the set-to-touch (STT) and through-dry (TD) stages of cure as determined by a Gardner circular drying time recorder are reported in the last two columns of the table. The strongly synergistic effect of the accelerator combination of N-(3-aminopropyl)piperazine and salicylic acid is illustrated by the gel time and dry times of example 4.

TABLE 1

| Example Number | Grams DGEBA[1] | D-400[2] | APP[3] | SA[4] | Gel time peak exotherm Min. | ° C. | STT, hr. | TD, hr. |
|---|---|---|---|---|---|---|---|---|
| 1 | 312 | 133.5 | | | 540 | 38 | | |
| 2 | 312 | 133.5 | 20 | | 99 | 201 | 11.5 | 17 |
| 3 | 312 | 133.5 | | 6.7 | 84 | 171 | 11.4 | 14 |
| 4 | 312 | 126.5 | 19 | 6.3 | 28 | 207 | 6.0 | 8.5 |

[1] Diglycidyl ether of Bisphenol A (isopropylidenediphenol) having an equivalent weight of 19.
[2] Jeffamine ® product, a polyoxypropylenediamine of structure I having an average molecular weight of about 400.
[3] N=(3-aminopropyl)piperazine.
[4] Salicylic acid.

EXAMPLE 5

An accelerated epoxy resin composition was formulated from 352 g. DGEBA, 93.5 g. JEFFAMINE D-230 product (a polyoxypropylenediamine of structure I having an equivalent weight per active hydrogen of 58 and an average molecular weight of about 230) and 18.7 g. of a mixture of N-(3-aminopropyl)piperazine and salicylic acid (3:1 by weight). Tests for gel time, set-to-touch and through-dry times as above gave values of 33 min., 5.9 hr. and 8.0 hr. respectively. Similar tests with DGEBA cured with D-230 alone gave values of 178 min., 12 hr. and 16 hr.

EXAMPLE 6

An accelerated epoxy resin composition was formulated from 325 g. DGEBA, 107.5 g. JEFFAMINE T-403 product (a polyoxypropylenetriamine of structure II with R equal to ethyl, having an equivalent weight per active hydrogen of about 80 and an average molecular weight of about 403) and 21.5 g. of a mixture of N-(3-aminopropyl)piperazine and salicylic acid (3:1). The mixture gelled in 36 minutes, whereas a similar test sample cured with unaccelerated T-403 gelled in 368 minutes.

Comparable results to those illustrated in the Tables and Examples, supra, are obtained using accelerator combinations within the invention disclosed but not specifically illustrated.

Having thus described out invention, we claim:

1. A process for accelerating the curing of a polyglycidyl ether of a polyhydric phenol cured with a polyoxyalkylenepolyamine which comprises:

incorporating therein an accelerator combination of N-(3-aminopropyl)piperazine and salicylic acid "wherein the weight ratio of N-(3-aminopropyl)piperazine to salicylic acid ranges from 10/1 to 1/1 and the combined weight of N-(3-aminopropyl)piperazine and salicylic acid when mixed with the polyoxyalkylenepolyamine ranges from 5 parts by weight per 100 parts of polyoxyalkylenepolyamine to 30 parts per 100 parts of polyoxyalkylenepolyamine."

2. A process according to claim 1 wherein the polyoxyalkylenepolyamine is a polyoxypropylenepolyamine.

3. A process according to claim 2 wherein the polyoxypropylenepolyamine is a polyoxypropylenediamine having an average molecular weight of about 400.

4. A process according to claim 2 wherein the polyoxypropylenepolyamine is a polyoxypropylenediamine having an average molecular weight of about 230.

5. A process according to claim 2 wherein the polyoxypropylenepolyamine is a polyoxypropylenetriamine having an average molecular weight of about 403.

* * * * *